Jan. 13, 1942.   A. S. FOSTER ET AL   2,269,895
PIPE JOINT
Filed July 5, 1939   2 Sheets-Sheet 1
FIG. 1
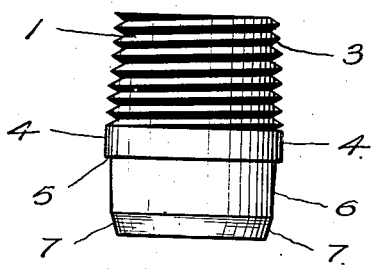
FIG. 2
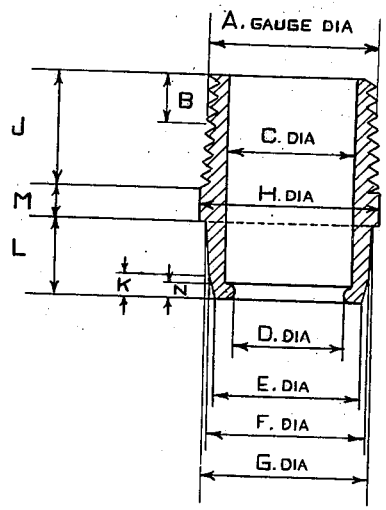
FIG. 3
| SIZE | A | B | | | C | D | E | F | G | H | J | K | L — FOR NOMINAL PIPE DIAS. | | | | M | N | TUBE | |
|---|---|---|---|---|---|---|---|---|---|---|---|---|---|---|---|---|---|---|---|---|
| | | STD | MAX | MIN | | | | | | | | | 4″.6.8. | 10.12. | 14″.15.18. | 21.24 | | | O/D | I/D |
| 1″ | 1·309 11 TPI | 3/8″ | ·44″ | ·31″ | 1 F″ | 7/8″ | 1·219″ | 1·250″ | 1·255″ | 1·343″ | 7/8″ | 3/16″ | 1/2″ | 17/32″ | 9/16″ | 11/16″ | 1/4″ | 5/32″ | 1·343 | 7/8″ |
FIG. 4
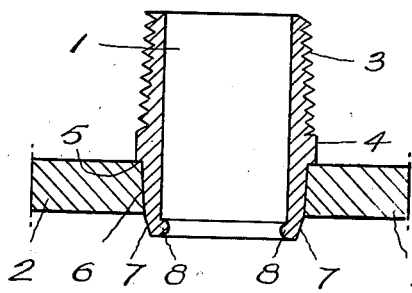
FIG. 5
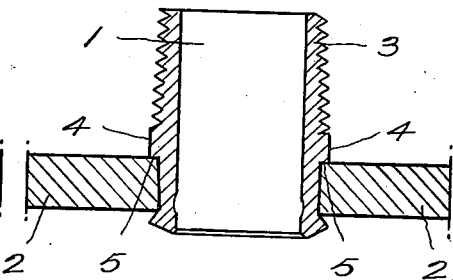
Inventors
Arthur Sidney Foster.
Geoffrey Murton Gill.
By Samuel ........
Attorneys Jan. 13, 1942.    A. S. FOSTER ET AL    2,269,895
PIPE JOINT
Filed July 5, 1939    2 Sheets-Sheet 2
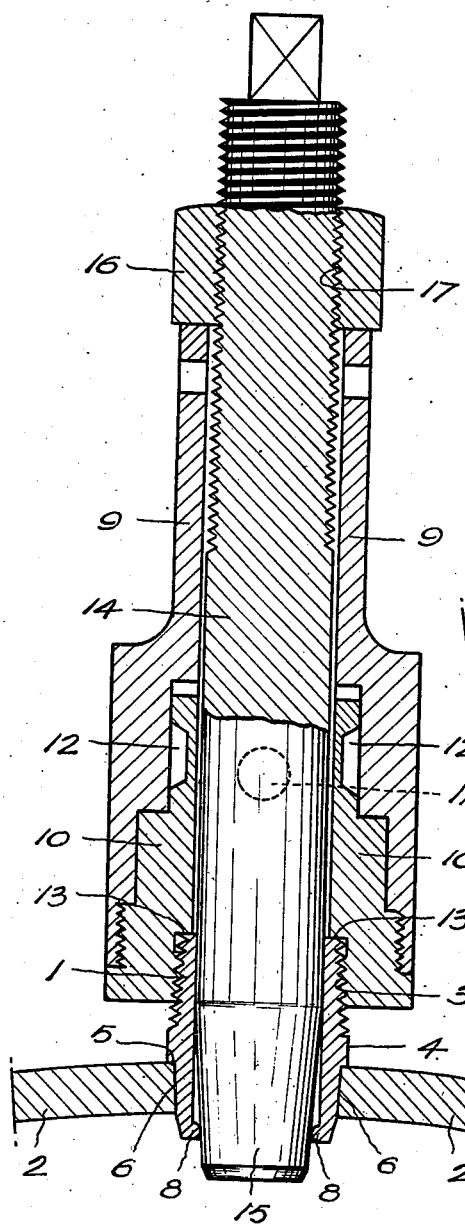
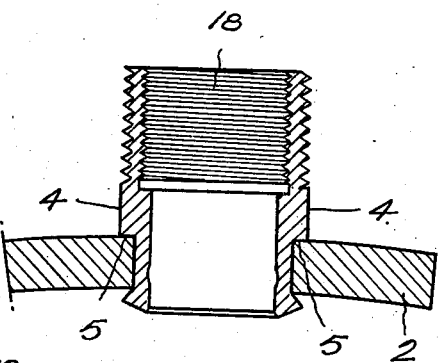
Inventors
Arthur Sidney Foster.
Geoffrey Murton Gill.

Patented Jan. 13, 1942

2,269,895

UNITED STATES PATENT OFFICE 2,269,895

PIPE JOINT

Arthur Sydney Foster, Stourport-on-Severn, and Geoffrey Murton Gill, London, England Application July 5, 1939, Serial No. 282,928

1 Claim. (Cl. 285—56)

The invention relates to the connection of service pipes or branches to mains of gas and water supplies. These connections in cast iron mains were usually made in the past by drilling a hole of the required size in the main pipe and tapping a screw thread therein and screwing in the connecting member. In steel mains, due to the thinner wall, although finer screw threads can be employed additional means became necessary and joints have been used in which a connection nipple for the branch has been screwed into the pipe and the inner end of this nipple has been thereafter riveted over inside the pipe wall by drawing an inserted internal conical mandrel past a bead or flange on the inner end of the nipple. Some form of packing joint was made on the exterior of the main around the nipple by means of a compressible packing and a saddle or the like placed over the nipple, pressure being applied to the saddle and thus to the packing by the socket part of the branch pipe screwing on to the nipple.

In a later joint a riveting effect or burring of the screwed connection branch or nipple over the wall of the pipe is produced both inside and outside the pipe wall. This is done by employing two separated beads near the end of the branch or nipple and expanding them by means of a conical mandrel drawn past them.

The development of centrifugal cast pipes or spun pipes for gas and water mains increases the problem of making satisfactory service connections, as the thickness of wall is insufficient to permit efficient tapping of screw threads for the standard nipple for ordinary cast iron mains, and the wall will not stand fine threading as the threads are apt to be stripped or damaged in making the connection.

It will be understood when the conditions are considered under which these connections have often to be made on gas and water mains in deep trenches in the ground, that there is considerable difficulty in the operation, and when the joint is made it is subjected to trying conditions since considerable forces are transmitted to the pipes through the soil under traffic loads, ground movements and the like.

In the present invention screw threading of the nipple into the main is avoided and the connection is made by an interference fit between the spigot part of the nipple and the wall of the hole in the main in conjunction with an expandable bead on the part of the spigot which is within the main, thus making an efficient gas or water tight connection.

The invention is therefore characterised by a connection member or nipple comprising in combination a tubular part on which an external thrust and jointing shoulder is formed intermediate of its length, a spigot part from this shoulder to one end, part at least of which spigot is externally tapered an inner bead or flange in this end and an externally screwed part above the shoulder to enable the service connection to be made on the nipple.

A preferred construction has the spigot part tapered over its whole length which more readily ensures the desired interference fit in the drilling made in the wall of the main. With such a tapered spigot it is also preferred to provide the inner extremity with a part of steeper taper to facilitate insertion.

This nipple will be forced into position in the drilling of the wall of the main pipe with its shoulder abutting against the pipe wall, and its bead will preferably be expanded over on the inner wall of the pipe by forcing a conical mandrel down the connection member in order to expand the bead and perform the desired riveting or burring operation.

In the appended drawings we have illustrated preferred embodiments of construction of the connection nipple and also means for securing it in the main pipe.

Figure 1 is an elevation of the improved nipple.

Figure 2 is a section thereof with dimension lines.

Figure 3 is a table of dimensions for the parts indicated by the lines in Figure 2 for a 1" nipple.

Figure 4 shows the nipple forced into a drilling in the tube.

Figure 5 is a similar sectional view after expansion.

Figure 6 is a sectional view showing an expanding mandrel in a chuck used for inserting and securing the nipple.

Figure 7 is a view of an internally screw threaded nipple suitable for connection to high pressure gas mains.

In these drawings 1 is the nipple generally and 2 is the wall of a main into which the nipple is secured. 3 is the externally screw threaded part for receiving a service connection pipe and fitting; it may be British standard pipe thread with a taper of 1 in 16 as in Figures 1 and 2 or it may be parallel as in Figure 6. 4 is a plain part finishing in a shoulder 5 for abutting against the exterior of the wall 2 of the main pipe. 6 is the plain spigot, which in the preferred construction is tapered from the shoulder to the inner end, and 7 is a more steeply tapered end part to facilitate insertion of the nipple. 8 is an internal bead formed on the nipple for enabling the riveting or expanding of the inner mouth of the nipple around the drilling in the wall to be effected.

The external locating shoulder 5 is placed at such a distance from the inner end of the spigot that it will abut against the pipe wall when the bead is in a position in relation to the inner surface of the pipe wall which will permit the riveting over to be properly performed. The plain spigot 6 should be accurately machined and its size must be capable of establishing such a fit in the particular size of drilling in the main pipe, that any turning or displacement of the nipple is practically impossible without disruption of the walls of the drilling and the nipple. This is best given by a wholly tapered spigot, but if a parallel position is desired at the upper part of the spigot it must be very slightly over size and then there is more risk in the forcing in of the nipple. The sizes and relation of these parts for a 1" nipple are given by Figures 2 and 3.

The external locating shoulder 5 enables the nipple spigot length to be determined correctly in relation to the pipe wall thickness so as to ensure that only the minimum internal projection within the main pipe necessary for the riveting operation is provided, whereas a screwed-in nipple is often inserted by the operator far enough to cause an obstruction to the gas or liquid flow in the main and unnecessary eddies are set up.

The nipple is forced into the main pipe by screw pressure, after drilling of the latter has taken place. For low pressure mains an existing central action main-drilling apparatus can be employed with a taper mandrel and a chuck into which the nipple may be screwed.

Such a known appliance which is not illustrated, has a tubular body part clampable on to the main pipe and a pivotal yoke having an internally screw-threaded boss in the arch through which a pressure screw or plunger is passed for applying pressure to a chuck or mandrel inserted in the body. After drilling a hole in the main wall and reaming it exact to size and removing any swarf, the drill chuck is replaced by a chuck 9 Figure 6, which has a removable adaptor 10 (so that various sizes may be employed) screwed onto its lower end and locked by a pinch bolt or the like at 11 entering a groove or recess 12.

The mouth of this adaptor 10 is threaded internally to screw on to a particular size of nipple 1 and has a shoulder 13 for bearing on the end of the nipple. A mandrel 14 with a tapered lower end 15 is placed in the chuck and a nut 16 on its threaded shank 17 can be set to bear upon the top of the chuck 9 when the conical part 15 is light contacting with the bead 8 of the nipple. This chuck and mandrel assembly is placed in the aforesaid drilling machine body and the pressure screw of the machine is rotated to apply considerable pressure to the mandrel and through this to the nut 16 and the nipple chuck 9 and so to the nipple 1 the spigot 6 of which is forced into the drilling in the wall 2 of the main pipe until the shoulder 5 abuts the walls. This is the position shown in Figure 6.

The nut 16 is now unscrewed to the upper end of the mandrel, and the pressure screw of the machine is rotated to force down the mandrel bringing its tapered part 15 forcibly against the internal bead 8 of the nipple and expanding it outwardly hard against the inner wall of the main, by downward pressure on the mandrel. This tends to tighten the nipple spigot into the main and keeps the shoulder 5 on the pipe wall all the time the operation of expanding or riveting over of the bead is taking place.

The result of expansion is shown approximately in Figure 5. The mandrel can be withdrawn by screwing down the nut 16 on to the top of the chuck 9 thus raising the mandrel but still holding the nipple in place through the pressure on the chuck and exerting no strain likely to slacken the effective hold of the nipple. A solid mandrel for expanding the smaller sizes of nipple is preferred, but for sizes above 1" a mandrel with rollers arranged in grooves in its tapered part can be employed to reduce the effort required.

Figure 6 shows a nipple with an internal screw thread at 18 which can be used with a high pressure main drilling machine in which a fluid-stopping plug is screwed into the interior of the nipple before the latter is inserted and can be removed for the expanding operation and again inserted directly after that operation. This screw thread 18 may be dispensed with, however, where a machine is employed having a connection to the nipple which is provided with a cock that can be closed for the same purpose before insertion of the nipple.

The shoulder 5 abutting against the wall of the main pipe takes all external shocks that may come upon the service connection directly on the wall of the main. A face on this shoulder which is perpendicular to the longitudinal axis of the nipple is suitable for all mains since the joint is really made on the taper spigot, but this face may be shaped by hand tools or otherwise, if desired, to conform with the curvature of the outside of the main pipe so that it will seat more snugly thereon.

The nipple can be made of wrought iron or steel, or in some cases, where corrosive action may be set up by the gas or fluid flowing along the main, a non-ferrous metal such as phosphor bronze may be used.

We claim:

A fixture for connecting a branch pipe to a gas or water main comprising a cylindrical body provided with a screw thread at the end which will be outermost from the main whereby the fixture may be attached to the branch pipe, an annular ridge formed on the exterior of the body part between the screw-threaded part and the opposite end of the body part and providing a shoulder facing said opposite end and spaced therefrom, an externally plain part between the shoulder and said opposite end of the body part which is tapered toward said end, and an inwardly projecting bead formed on the inner wall of said plain part at the end thereof which will lie within the main, said fixture being adapted to be forced into a plain hole in a main until the shoulder bears on the outer surface of the main and to be secured to the main by expanding the beaded end of the fixture outwardly into engagement with the inner wall of the main by pressure applied to a tapered mandrel which is forced through the fixture toward the interior of the main.

ARTHUR SYDNEY FOSTER.
GEOFFREY MURTON GILL.